United States Patent
Awazu et al.

(10) Patent No.: US 7,657,165 B2
(45) Date of Patent: *Feb. 2, 2010

(54) IMAGE TAKING APPARATUS

(75) Inventors: Kouhei Awazu, Asaka (JP); Kentaro Tokiwa, Asaka (JP)

(73) Assignee: Fujifilm Corporation, Tokyo (JP)

( * ) Notice: Subject to any disclaimer, the term of this patent is extended or adjusted under 35 U.S.C. 154(b) by 554 days.

This patent is subject to a terminal disclaimer.

(21) Appl. No.: 11/485,441

(22) Filed: Jul. 13, 2006

(65) Prior Publication Data
US 2007/0014557 A1   Jan. 18, 2007

(30) Foreign Application Priority Data
Jul. 14, 2005   (JP)   ............................. 2005-206089
Mar. 31, 2006  (JP)   ............................. 2006-097077
May 26, 2006   (JP)   ............................. 2006-146758

(51) Int. Cl.
*G03B 15/05* (2006.01)
(52) U.S. Cl. ........................................ 396/62; 396/200
(58) Field of Classification Search ............... 396/62, 396/175, 177, 178, 200; 362/16–18
See application file for complete search history.

(56) References Cited

U.S. PATENT DOCUMENTS 5,734,934 A * 3/1998 Horinishi et al. ............. 396/62
6,011,929 A * 1/2000 Fuke et al. ................. 396/175
6,535,690 B2 * 3/2003 Tanabe ....................... 396/62

FOREIGN PATENT DOCUMENTS

| JP | 55-129326 A | 10/1980 |
| JP | 2-291538 A | 12/1990 |
| JP | 6-180469 A | 6/1994 |
| JP | 6-3262779 B2 | 12/2001 |

* cited by examiner

*Primary Examiner*—W. B. Perkey
(74) *Attorney, Agent, or Firm*—Birch, Stewart, Kolasch & Birch, LLP

(57) ABSTRACT

An image taking apparatus has a small light-emitting section capable of easily adjusting a luminous intensity distribution of flash. Two reflection side plates are disposed such that they cover Fresnel lenses disposed on both ends of a protector when a zoom switch is operated to a WIDE side, light emitted sideway from an arc tube is reflected to the two reflection side plates and is guided toward a central side of the protector, and the luminous intensity distribution is adjusted such as to fit the WIDE image taking angle of view. If the zoom switch is operated to a TELE side, the two reflection side plates are inclined, light emitted sideway from the arc tube is guided to the Fresnel lenses, and the luminous intensity distribution is adjusted to fit a TELE image taking angle of view.

6 Claims, 16 Drawing Sheets

(a)

(b)

IMAGE TAKING APPARATUS

BACKGROUND OF THE INVENTION

1. Field of the Invention

The present invention relates to an image taking apparatus which includes an image pickup device and which forms a subject image on the image pickup device and produces a picture signal.

2. Description of the Related Art

Many image taking apparatuses include light-emitting sections which emit flash toward a subject in synchronization with image taking action. In such an image taking apparatus, if luminous intensity distribution of flash emitted from the light-emitting section is set to a wide-angle side, much light is emitted out of image taking angle of view corresponding to a telephoto angle in response to a zoom switch being operated to a telephoto side and therefore, electric power is consumed in vain. Therefore, many image taking apparatuses employ a technique in which luminous intensity distribution of flash can be changed in association with operation of the zoom switch (see Japanese Patent Application Laid-open (JP-A) No. 55-129326 for example). According to JP-A 55-129326, at least one of an arc tube and a reflector is moved forward or rearward in the optical axial direction so that luminous intensity distribution suitable for the image taking angle of view is obtained in accordance with operation of the zoom switch.

However, since the arc tube such as a xenon tube is of rod-like shape, there still remains a problem that redundant light is emitted toward side of the arc tube and electric power is consumed in vain.

As described in Japanese Patent Application Laid-open No. 2-291538, there is a technique in which side reflection means is provided on a side of the arc tube, wastefully discharged electric power is emitted into the image taking angle of view, thereby enhancing the electric power efficiency.

As a technique in which the luminous intensity distributions is adjusted to enhance the electric power efficiency, there is a technique in which Fresnel lens is moved forward and rearward in the optical axial direction in addition to the arc tube or the reflector, thereby bringing flash into preferable luminous intensity distribution (see Japanese Patent No. 3262779), and there is also a technique in which a reflector plate is deformed to bring flash into preferable luminous intensity distribution (see Japanese Patent Application Laid-open No. 6-180469).

In any of the techniques disclosed in the patent documents 1 to 4, however, there is a problem that since a mechanism which moves the arc tube or the reflector in the optical axial direction, a mechanism which moves the Fresnel lens forward and rearward, or a mechanism which deforms the reflector must be provided, the structure of the light-emitting section becomes complicated and is increased in size.

SUMMARY OF THE INVENTION

The present invention has been made in view of the above circumstances and provides a small image taking apparatus having a light-emitting section capable of easily adjusting the luminous intensity distribution of flash.

The present invention provides an image taking apparatus which includes an image taking lens capable of varying a focal length and which takes an image by capturing subject light by the image taking lens, the image taking apparatus includes:

a light-emitting section which emits flash toward a subject in synchronization with an image-taking operation, wherein the light-emitting section includes:

a rod-like arc tube, a reflector which surrounds a rear portion of the arc tube in a circumferential direction and which forwardly reflects flash emitted rearward from the arc tube, two reflection side plates which are disposed on both sides of the reflector and which reflect flash from the arc tube, a protector which is provided, at locations thereof corresponding to both ends of the arc tube, with Fresnel lenses for inwardly condensing transmission flash, and which covers a front surface of the arc tube and through which flash from the arc tube transmits toward the subject, and an inclination adjuster which adjusts inclination of the two reflection side plates in accordance with a focal length of the image taking lens.

According to the image taking apparatus of the invention, the Fresnel lenses are formed at the positions corresponding to the both ends of the arc tube of the protector. Flash from the arc tube is not introduced into the Fresnel lenses until the inclinations of the two reflection side plates are adjusted such that the inclinations become predetermined values or more (or less) of the two reflection side plates by the inclination adjuster in accordance with the focal length of the image taking lens.

For example, when the focal length of the image taking lens is on the short focus side and it is necessary to emit flash toward a relatively wide image taking angle of view, the inclinations of the two reflection side plates are adjusted by the inclination adjuster so that the flash from the arc tube is not introduced to the Fresnel lenses, the luminous intensity distribution is adjusted such that it is spread toward the peripheral edge of the image taking angle of view and then, the flash can be emitted toward the wide image taking angle of view range.

When it is necessary that flash is not emitted toward an angle of view that is narrower than the relatively wide image taking angle of view until the focal length of the image taking lens is switched to the long focus side by the operation of the zoom switch, inclinations of the two reflection side plates are adjusted by the inclination adjuster. With this, a portion of the flash is allowed to enter the Fresnel lenses. The light that entered the Fresnel lenses is collected inward and the luminous intensity distribution is adjusted such that electricity is concentrated on a range that is narrower than that when the light is on the short focus side and then, the flash may be emitted.

To adjust the luminous intensity distribution of the flash, in the present invention, the Fresnel lenses which inwardly collects the transmission flash at the positions corresponding to the both ends of the arc tube of the protector are formed, and it is determined whether the Fresnel lenses should be used or not by adjusting the inclinations of the reflection side plates using the inclination adjuster. When the Fresnel lenses should be used, the inclinations of the two reflection side plates are adjusted, and the incident angle of flash entering the Fresnel lenses is changed. With this, the luminous intensity distribution can easily be adjusted.

That is, an image taking apparatus having a light-emitting section capable of easily adjusting the luminous intensity distribution of flash is realized.

It is preferable that the light-emitting section is capable of moving between an accommodation position where the light-emitting section is accommodated in a main body of the image taking apparatus except the light-emitting section and a pop-up position projected from the main body. Further, it is preferable that the image taking apparatus comprises a biasing member which biases the light-emitting section in a pop-up direction, a retaining member which retains the light-emitting section to the accommodation position, a pop-up button which releases the retaining state maintained by the retaining member and pops up the light-emitting section, and a power transmission member which transmits power required for allowing the light-emitting section to carry out motion in accordance with a focal length of the image taking lens to the inclination adjuster from the main body.

If the light-emitting section is fixed to the main body, when flash is emitted to the subject, red-eye phenomenon is prone to be generated if the subject is a human. When the lens barrel can be telescopically extended, the telescopically extended lens barrel may be irradiated with flash in some cases. If such a case is taken into consideration, it is preferable that the light-emitting section can move between the accommodation position where the image taking apparatus is accommodated in the main body except the light-emitting section and the pop-up position projecting from the main body.

If the light-emitting section can pop up, and the above preferable configuration is employed, even when the light-emitting section is popped up by the operation of the pop-up button, power is transmitted to the inclination adjuster of the light-emitting section by the power transmission member and luminous intensity distribution of flash is preferably adjusted.

Here, it is preferable that the inclination adjuster adjusts inclinations of the two reflection side plates into such a direction that the two reflection side plates are oriented parallel to the protector as the focal length of the image taking lens is closer to the long focus side.

With this configuration, the two reflection side plates are adjusted by the inclination adjuster into a direction parallel to the protector, as the focal length is closer to the long focus side. With this, flash emitted sideway from the arc tube is introduced into the Fresnel lenses and the flash is inwardly collected by the Fresnel lenses, and the luminous intensity distribution of transmission flash passing through the entire protector is adjusted.

If the luminous intensity distribution is adjusted and electricity of flash emitted sideway is effectively utilized and the electricity efficiency is enhanced, flash can reach to a further subject.

As the two reflection side plates are adjusted by the inclination adjuster into a direction that is closer to parallel to the protector, a gap between the protector and the tip ends of the two reflection side plates is increased in size. If the gap is increased in size, light leaks from the gap, and there is an adverse possibility that the light emitted from the arc tube is not effectively utilized.

Hence, it is preferable that the protector has a Fresnel lens formed along a locus formed by a tip end of each of the two reflection side plates when the inclination adjuster adjusts inclinations of the two reflection side plates in a direction parallel to the protector.

If the Fresnel lenses are formed in this manner, wherever the two reflection side plates are located, light emitted from the arc tube is collected by the Fresnel lenses, the light is emitted toward the subject, and the light emitting efficiency is enhanced. Further, since the thickness of an end of the protector, i.e., a portion forming the Fresnel lens can be increased, there is an effect that the notch of the Fresnel lens can easily be formed when the Fresnel lenses are formed by mold.

The image taking apparatus may include reflection plates which reflect light emitted sideway beyond the reflection side plates toward the protector.

With this, light passing through the gap and emitted sideway is reflected by the reflection plates and the light is introduced toward the protector. Thus, almost all light emitted from the arc tube is guided toward the subject and the light emitting efficiency is enhanced.

It is preferable that the power transmission member transmits power to the inclination adjuster even if the light-emitting section is located in any of the accommodation position, the pop-up position and an intermediate position between the accommodation position and the pop-up position.

If the power is transmitted to the inclination adjuster not only when the light-emitting section is in the accommodation position and the pop-up position, but also it is in the intermediate position, even if a user puts his or her hand over the light-emitting section and the light-emitting section is located in the intermediate position for taking a picture, the luminous intensity distribution of flash is reliably adjusted.

It is preferable that the inclination adjuster simultaneously adjusts inclinations of the two reflection side plates using one mechanism.

An image taking apparatus having an image taking optical system whose focal length can be varied has a lens barrel which can telescopically extend as in the image taking apparatus of the present invention in many cases. If the inclinations of the two reflection side plates are adjusted in association with motion of the telescopically expendable lens barrel, a mechanism which adjusts the inclinations of the two reflection side plates into a position suitable for the operating position of the zoom switch can be realized with a simple structure.

The inclination adjuster may adjust inclinations of the two reflection side plates independently from each other.

In an image taking environment where backlight exists on the right half of an image angle, if the inclinations of the two reflection side plates can be adjusted simultaneously, flash which is symmetric with respect to a center of the image taking range is always emitted. Thus, the right half which is backlight becomes brighter than the left side, and uneven brightness is generated.

To solve such a problem, if the inclinations of the two reflection side plates can independently be adjusted, the luminous intensity distribution can be adjusted such that asymmetric flash, i.e., the light emitting electricity is mainly be collected to the left side and the flash can be emitted.

As explained above, an image taking apparatus having a light-emitting section capable of easily adjusting the luminous intensity distribution of flash is realized.

DETAILED DESCRIPTION OF THE INVENTION

Embodiments of the invention will be explained below.

Figure 1:
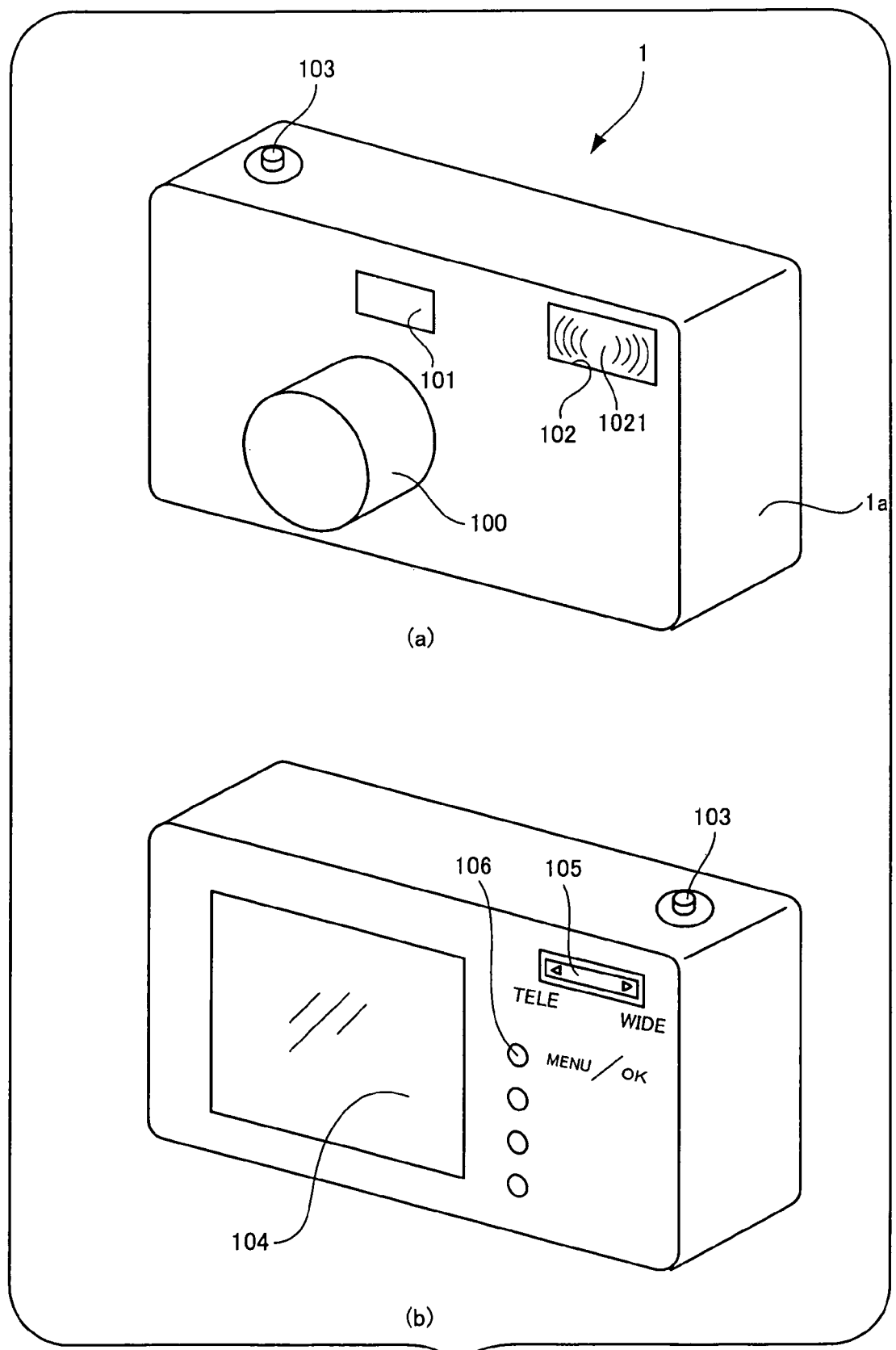
FIG. 1 is a diagram showing an outward appearance of a digital camera according to an embodiment of an image taking apparatus of the present invention.

FIG. 1 shows an outward appearance of a digital camera 1 according to an embodiment of an image taking apparatus of the present invention.

Part (a) of FIG. 1 shows a perspective view of a front surface of the digital camera 1 as viewed from a front diagonally upper side, and part (b) of FIG. 1 shows a perspective view of a back surface of the digital camera 1 as viewed from a rear diagonally upper side.

The digital camera 1 shown in parts (a) and (b) of FIG. 1 includes an image taking lens capable of varying a focal length. The image taking lens captures a subject, thereby taking an image.

As shown in part (a) of FIG. 1, a camera body 1a is provided at its front surface central portion with a lens barrel 100 which can telescopically extend and retract. An image taking lens capable of varying the focal length is incorporated in the lens barrel 100. Part (a) of FIG. 1 shows a state after a power supply switch is turned ON, preparations for an image taking operation are made, and the lens barrel is extended.

A finder 101 is provided above the lens barrel 100. A flash light-emission window 102 is provided adjacent to the finder 101. A protector 1021 with Fresnel lenses formed at both ends thereof is fit into the light-emission window 102 in the longitudinal direction. Flash is emitted from a light-emitting section in the flash light-emission window 102 toward a subject in synchronization with the image taking operation by the release button 103.

A display panel 104 is provided on a back surface of a camera body 1a shown in part (b) of FIG. 1. An image of a subject captured by the image taking lens is continuously displayed on the display panel 104. A zoom switch 105, a menu switch 106 and the like are provided adjacent to the display panel 104. A zooming operation from telephoto (TELE) to wide angle (WIDE) is carried out in accordance with operation of the zoom switch 105.

The light-emitting section is disposed in the digital camera 1 of the embodiment. The light-emitting section can adjust the luminous intensity distribution into an arbitrary shape so that flash can be emitted toward a range corresponding to the image taking angle of view in accordance with operation of the zoom switch 105 from the light-emission window 102.

Figure 2:
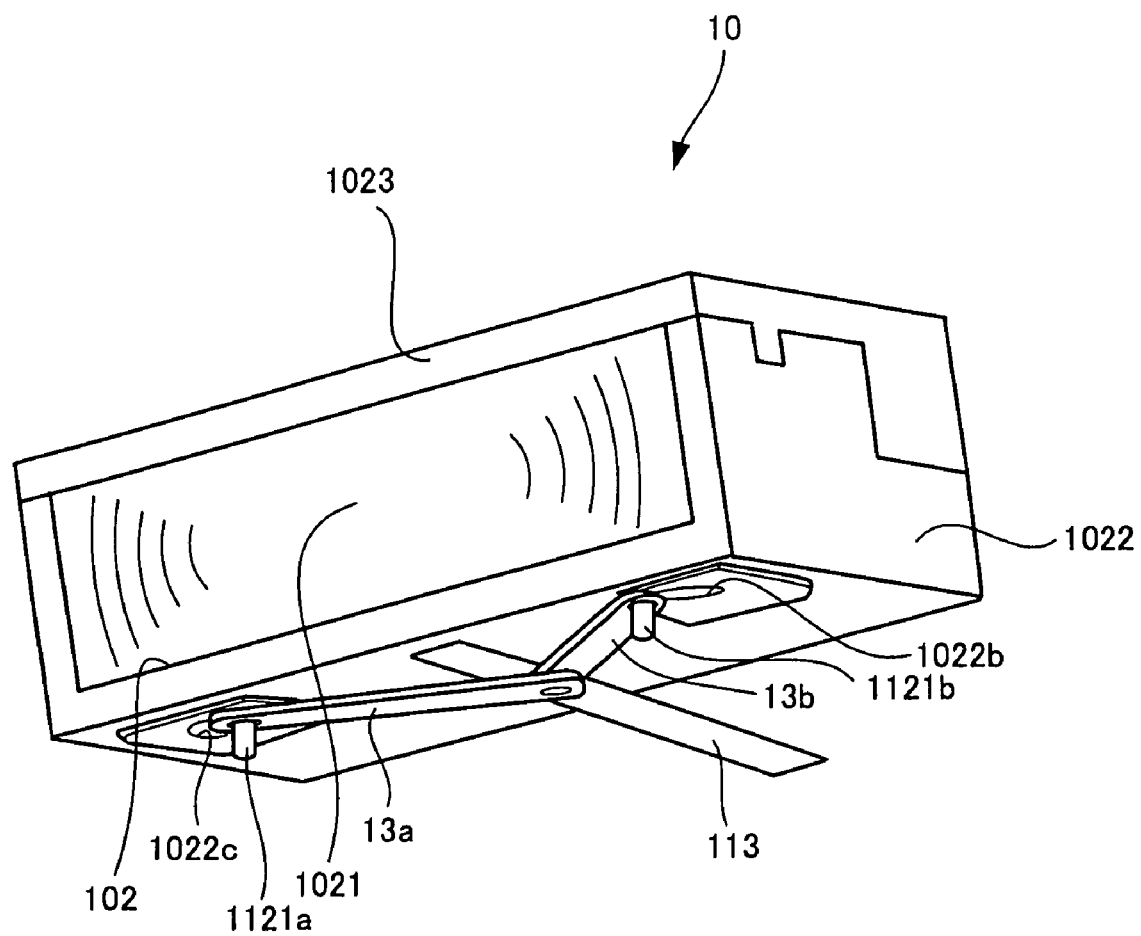
FIG. 2 is a diagram an outward appearance of an accommodation case 10 in which a light-emitting section is accommodated.

FIG. 2 shows an outer appearance of an accommodation case 10 in which the light-emitting section is accommodated.

The accommodation case 10 shown in FIG. 2 includes the protector 1021 shown in FIG. 1 also, a base section 1022 and a lid section 1023. The window 102 is formed by mounting the lid section 1023 on the base section 1022. If the protector 1021 is fitted to the window 102, the accommodation case 10 having the outer appearance shown in FIG. 2 is obtained.

Two through holes 1022b and 1022c are formed in a lower surface of the accommodation case 10 symmetrically with respect to a central portion of the lower surface of the accommodation case 10. The through holes 1022b and 1022c are formed such that space therebetween is broadened toward one end. The through holes 1022b and 1022c are diagonally notched toward a rear side wall of the accommodation case 10 such that inclination of two reflection side plates that will be described later can be adjusted while defining a side of the protector 1021 is a front surface. Engaging members 1121a and 1121b extending downward from one ends of the two reflection side plates (later-described) are engaged in the through holes 1022b and 1022c. The engaging members 1121a and 1121b are connected through link members 13a and 13b. In this example, one ends of the two link members 13a and 13b are connected to a link-moving member 113 which moves forward and rearward in association with forward and rearward movements of the lens barrel. In this embodiment, if the link-moving member 113 moves forward (toward the protector), the two link members 13a and 13b are turned to an opening direction such as to open the link members 13a and 13b, and if the link-moving member 113 moves rearward (in a direction away from the protector), the two link members 13a and 13b are turned to a closing direction such as to close the link members 13a and 13b. Thus, if the link member 113 moves forward and rearward, the link members 13a and 13b are turned such that they are guided along the shapes of the through holes 1022b and 1022c and such that the link members 13a and 13b are in synchronization with each other by the connection of the two link members 13a and 13b.

With this configuration, the inclinations of the two reflection side plates are precisely adjusted in accordance with movement of the lens barrel 100.

Now, there will be explained in detail a configuration of the light-emitting section in the state when the accommodation case 10 shown in FIG. 2 is decomposed and constituent members in the accommodation case 10 are taken out.

Figure 3:
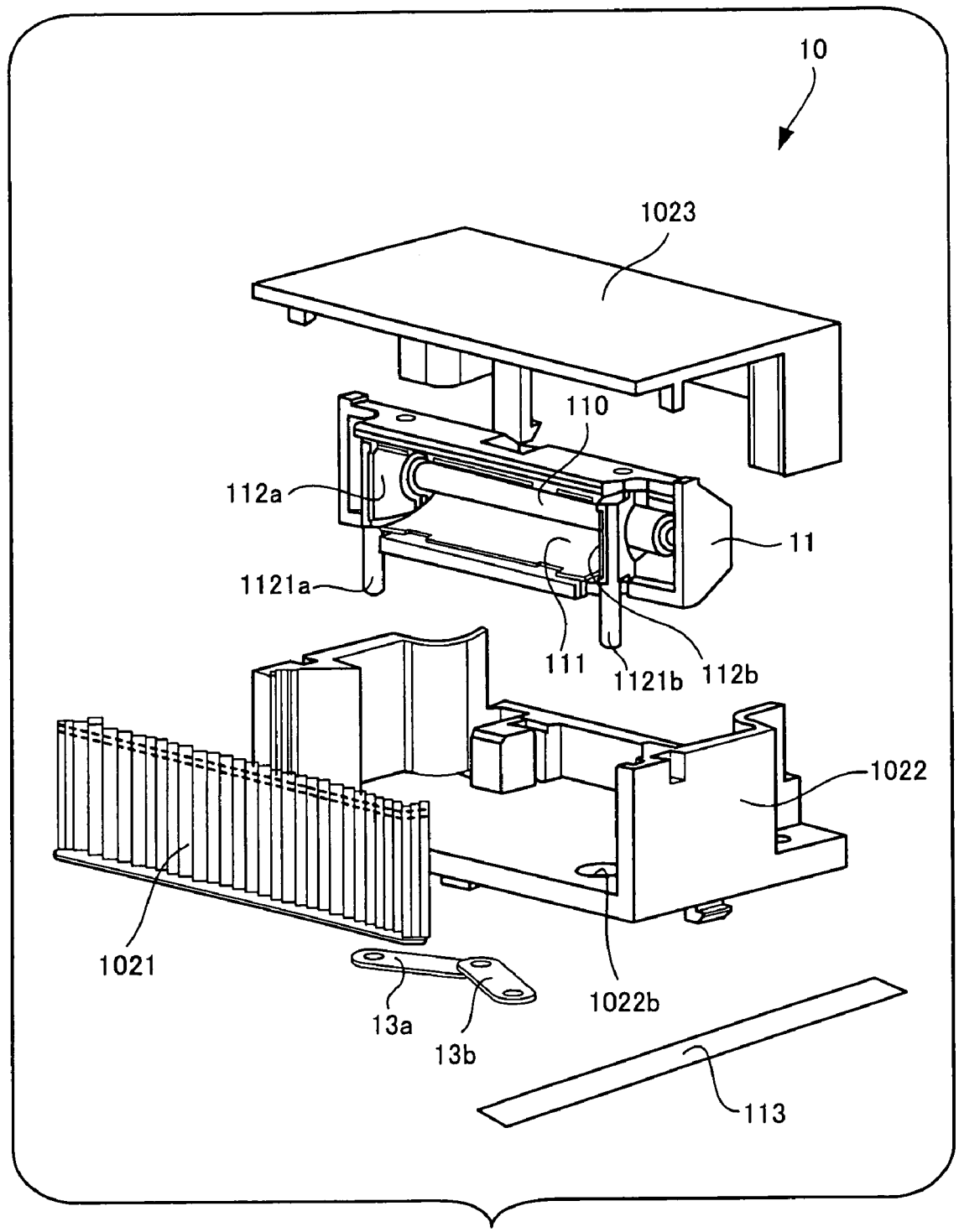
FIG. 3 is an exploded view used for explaining a configuration of the light-emitting section in the accommodation case 10 shown in FIG. 2.

FIG. 3 is an exploded view used for explaining a structure of the light-emitting section in the accommodation case 10 shown in FIG. 2.

A folder 11 in which an arc tube 110 and a reflector 111 are accommodated is shown at a central portion of FIG. 3. The folder 11 is provided at its side opposed to the protector 1021 with an opening. Flash is emitted through the opening toward the protector 1021. The side of the opening is defined as a front side. The rod-like arc tube 110 and the reflector 111 which surrounds a rear portion of the arc tube 110 in the circumferential direction and which forwardly reflects flash emitted from the arc tube 110 rearward are accommodated in deep side in the folder 11. The two reflection side plates 112a and 112b are disposed on both sides of the reflector 111 and reflect flash from the arc tube 110. The reflection side plates 112a and 112b are disposed such as to project forward from the opening of the folder 11. Deep side ends of the two reflection side plates 112a and 112b are turnably supported by spindles in the folder 11. Therefore, the ends disposed such as to project from the opening can turn abound the spindles. The engaging members 1121a and 1121b shown in FIG. 2 are engaged with ends of the two reflection side plates which can turn. Tip ends of the engaged engaging members 1121a and 1121b are engaged with the through holes 1022b (see FIG. 2) and 1022c, respectively.

Therefore, if the link-moving member 113 extending rearward from the lower surface of the accommodation case 10 is connected to the lens barrel 100, the link-moving member 113 moves forward and rearward in accordance with forward and rearward motions of the lens barrel 100, and inclinations of the two reflection side plates 112a and 112b are precisely adjusted by well-balanced association by the link members 13a and 13b (they open and close at the same angle).

That is, in this embodiment, the combination of the lens barrel 100, the link-moving member 113 connected to the lens barrel 100, the pair of link members 13a and 13b whose one ends are connected to the link-moving member 113, the engaging members 1121a and 1121b connected to the other ends of the link members 13a and 13b, the through holes 1022b and 1022c in which the engaging members 1121a and 1121b are engaged, and the reflection side plates 112a and 112b which are turnably mounted on the deep side mounting sections of the folder corresponds to an example of the inclination adjuster according to the present invention.

Here, the operation will be explained.

Figure 4:
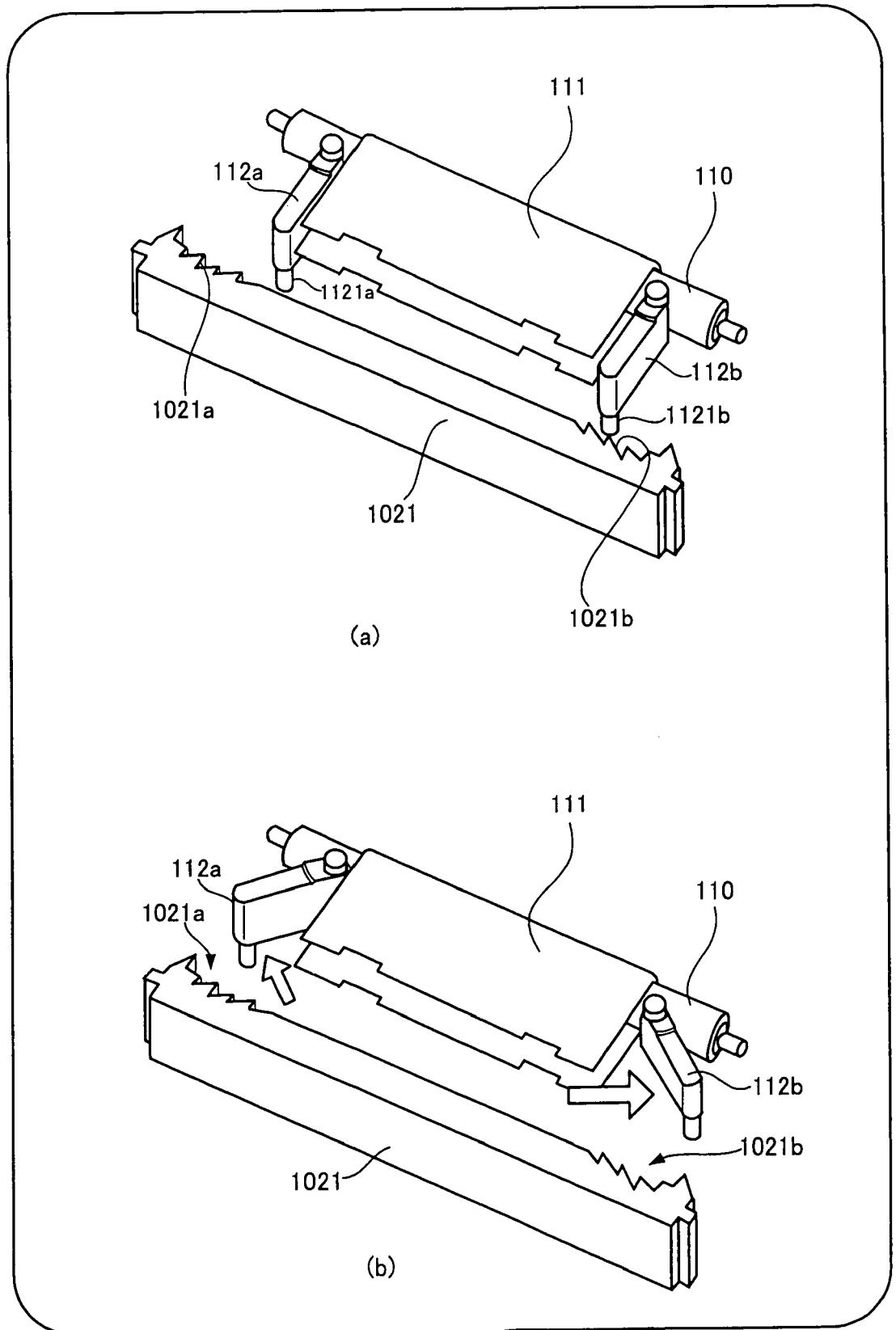
FIG. 4 is a diagrams used for explaining a positional relation between an arc tube, a reflector and a reflection side plate, and a position of Fresnel lenses formed on both ends of a protector.
Figure 5:
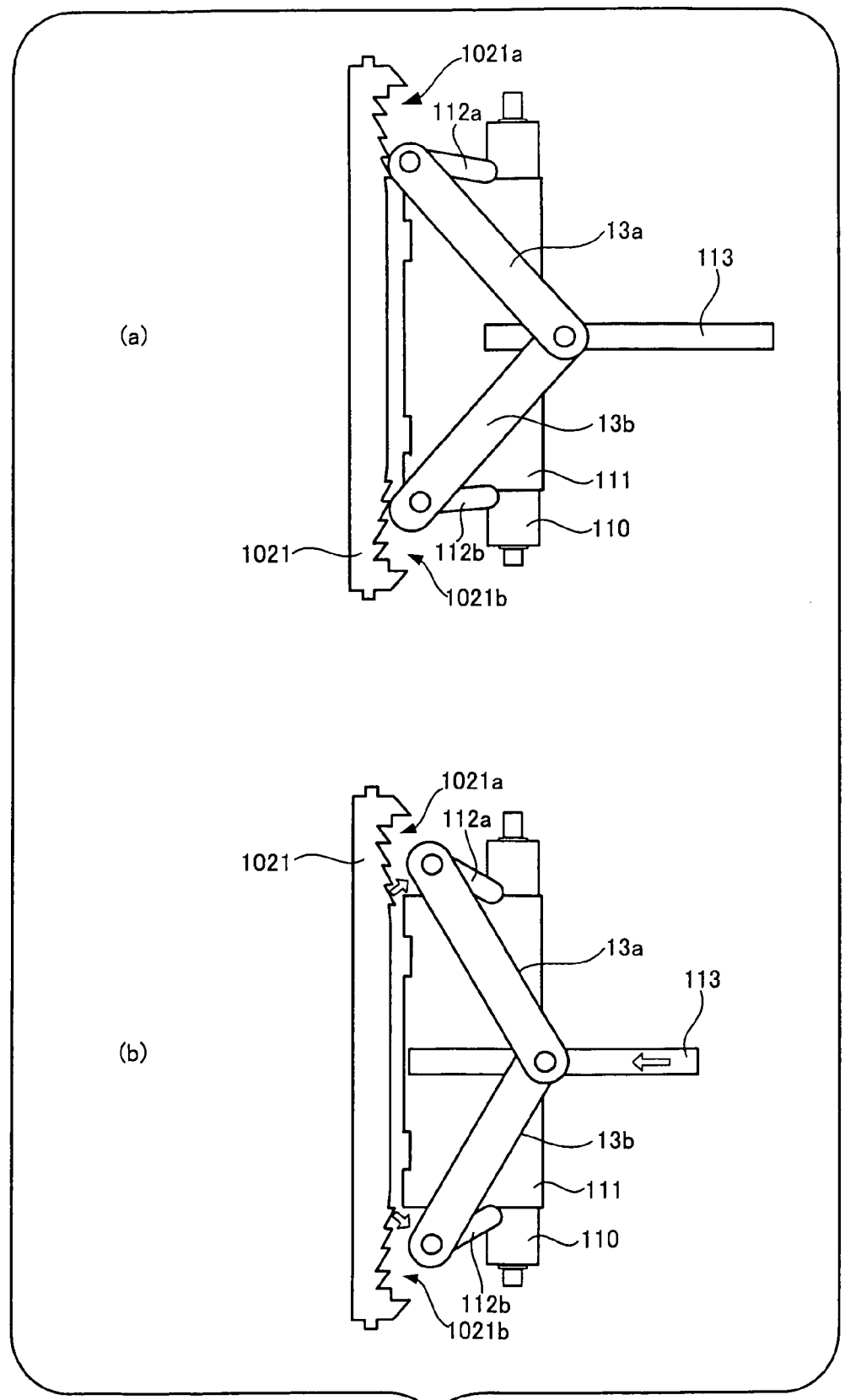
FIG. 5 is a diagram of the state shown in parts (a) and (b) of FIG. 4 as viewed from below.

FIG. 4 is used for explaining a position relation between the arc tube 110 accommodated in the folder 11, the reflector 111 provided such as to surround the arc tube 110, the protector 1021 disposed such as to cover front surfaces of the arc tube 110 and the reflector 111, and the reflection side plates 112a and 112b. FIG. 5 is a diagram of the folder 11 shown in FIG. 4 as viewed through the link members 13a and 13b disposed on the lower surface of the folder 11 and through the link-moving member 113 to which one ends of the link members 13a and 13b are connected (i.e., as viewed from below).

Part (a) of FIG. 4 and part (a) of FIG. 5 show a position relation between the arc tube 110, the reflector 111, the protector 1021 and the reflection side plates 112a and 112b when the zoom switch is operated to the end of the WIDE side, i.e., to the end of a short focus side. Part (b) of FIG. 4 and part (b) of FIG. 5 show how the positions of the reflection side plates 112a and 112b are varied when the zoom switch is operated to the TELE side, i.e., a long focus side with respect to the states shown in part (a) of FIG. 4 and part (a) of FIG. 5.

As shown in part (a) of FIG. 4 and part (a) of FIG. 5, when the zoom switch is on the WIDE side, in order to prevent flash from the arc tube 110 and the reflector 111 from entering the Fresnel lenses 1021a and 1021b, the two reflection side plates 112a and 112b are disposed at positions to cover and hide the Fresnel lenses 1021a and 1021b located at both ends of the protector 1021. When the reflection side plates 1121a and 1121b are in that state, if the zoom switch 105 (see part (b) of FIG. 1) is operated to the TELE side and the lens barrel 100 starts extending telescopically (see part (a) of FIG. 1), the link-moving member 113 starts moving in the direction of the arrow shown in the vicinity of a reference character 113 in part (b) of FIG. 5, and the two reflection side plates 112a and 112b start moving in the direction of the arrow shown near reference characters 112a and 112b in part (b) of FIG. 4 and part (b) of FIG. 5. The link-moving member 113 moves in accordance with the telescopically extending motion of the lens barrel 100. With this, if the inclinations of the two reflection side plates 112a and 112b are started to be adjusted in the direction of the arrow, flash emitted toward a side of the arc tube 110 is introduced little by little to the Fresnel lenses 1021a and 1021b formed at both ends of the protector 1021.

With this structure, inclinations of the two reflection side plates 112a and 112b are adjusted into a direction perpendicular to the protector 1021 so that the flash does not enter the Fresnel lenses 1121a and 1121b, and it is possible to adjust the luminous intensity distribution of the flash such as to fit the short focus (wide angle). If the inclinations of the two reflection side plates are adjusted into a direction which is in parallel to the protector so that flash can enter the Fresnel lenses 1021a and 1021b, and further, if the incident angle of the flash which enters the Fresnel lenses 1021a and 1021b is varied by adjusting the inclinations of the two reflection side plates, the luminous intensity distribution of the flash can be adjusted to fit the long focus (telephoto) side.

That is, a small image taking apparatus having a light-emitting section capable of easily adjusting the luminous intensity distribution of flash is realized.

Figure 6:
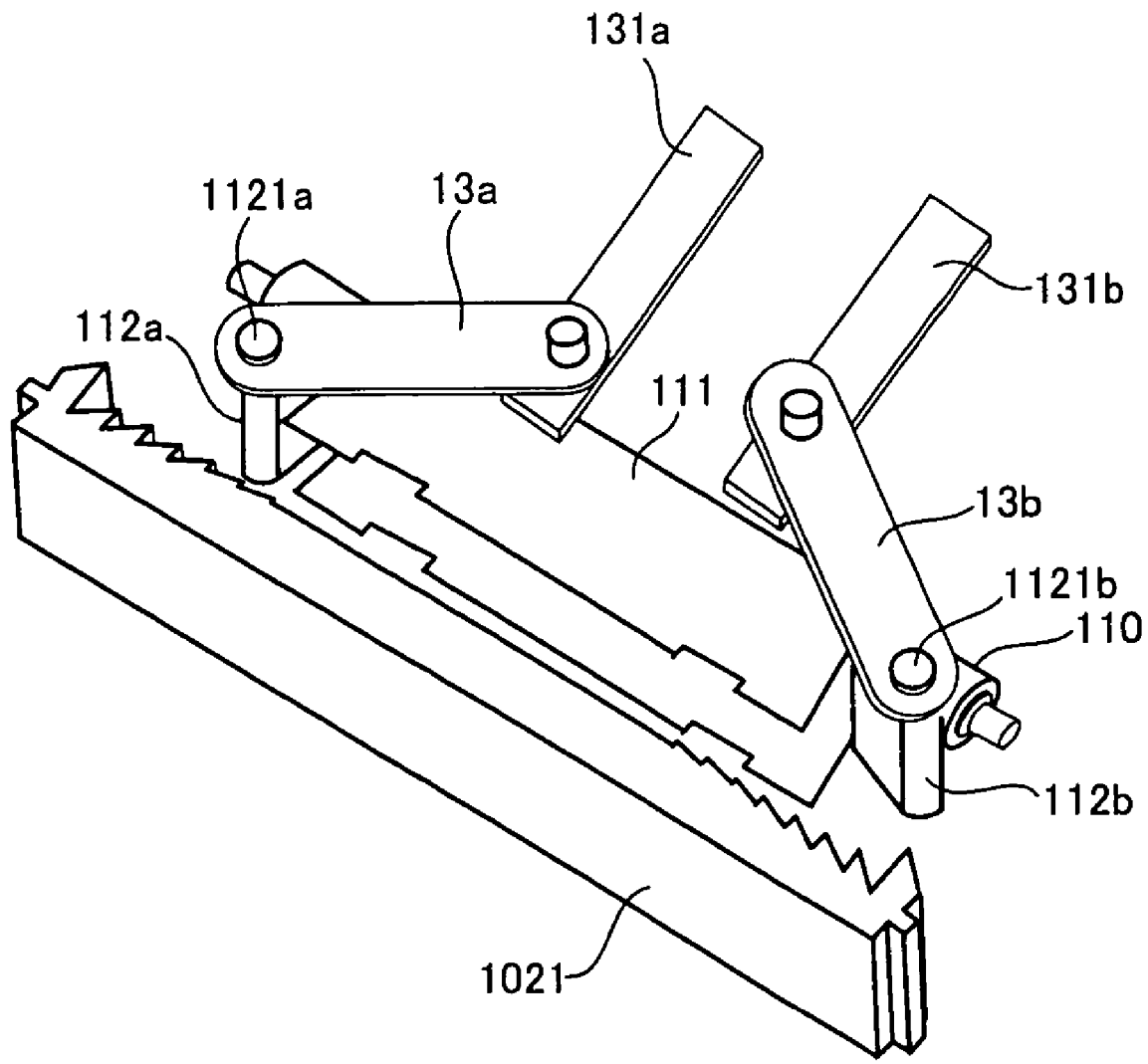
FIG. 6 is a diagram used for explaining a modification of a first embodiment.

FIG. 6 is a diagram used for explaining a modification of a first embodiment.

Like FIG. 5, FIG. 6 is a diagram viewing a side of the accommodation case through a link member located below the accommodation case from which the accommodation case shown in FIG. 2 is removed.

As explained with reference to FIGS. 1 to 5, the inclination adjuster may simultaneously adjust inclinations of the two reflection side plates using one mechanism (the two reflection side plates 112a and 112b may be connected to each other through the two link members 13a and 13b, and one ends of the link members 13a and 13b may be connected to the link-moving member 113 which moves forward and rearward in accordance with the forward and rearward motion of the lens barrel 100. Alternatively, the inclinations of the two reflection side plates 112a and 112b may be adjusted independently.

In the example shown in FIG. 6, instead of connecting the link members 13a and 13b which connect the engaging members 1121a and 1121b of the reflection side plates 112a and 112b to the one link-moving member 113 in FIG. 5, the link members 13a and 13b are connected to two link-moving members 131a and 131b. At that time, it is associated with an operating position of the zoom switch of course, and the two link-moving members 131a and 131b are individually driven and moved forward and rearward based on a brightness signal from a brightness detector disposed in the image taking apparatus.

With this, in an image taking environment where there is backlight in the right half of the image taking angle of view, the one reflection side plate 112a of the two reflection side plates 112a and 112b is brought into a state perpendicular to the protector by advancing the link-moving members 131a and 131b, and the other reflection side plate 112b is inclined into a direction parallel to the protector 1021 by retreating the link-moving members 131a and 131b. With this, laterally asymmetric flash is emitted, i.e., luminous intensity is distributed such that light emitting electric power is concentrated mainly on the left side and the flash is emitted.

As explained above, a small image taking apparatus having a light-emitting section capable of easily adjusting the luminous intensity distribution of flash is realized.

When the two reflection side plates 112a and 112b are adjusted into a direction parallel to the protector 1021, a gap between the protector 1021 and tip ends of the reflection side plates 112a and 112b is increased as the reflection side plates 112a and 112b are adjusted further as shown in FIGS. 4 to 6. Thus, light which moves sideway leaks from the gap as the two reflection side plates 112a and 112b are adjusted in the direction parallel to the protector 1021, loss is produced in the amount of light emitted from the arc tube, and the light emitting efficiency of the flash is deteriorated. If the light emitting efficiency of the flash is deteriorated, a distance through which an image taking auxiliary light reaches is shortened. Thus, it is desired to prevent light from leaking from the gap, and to positively utilize the light.

Figure 7:
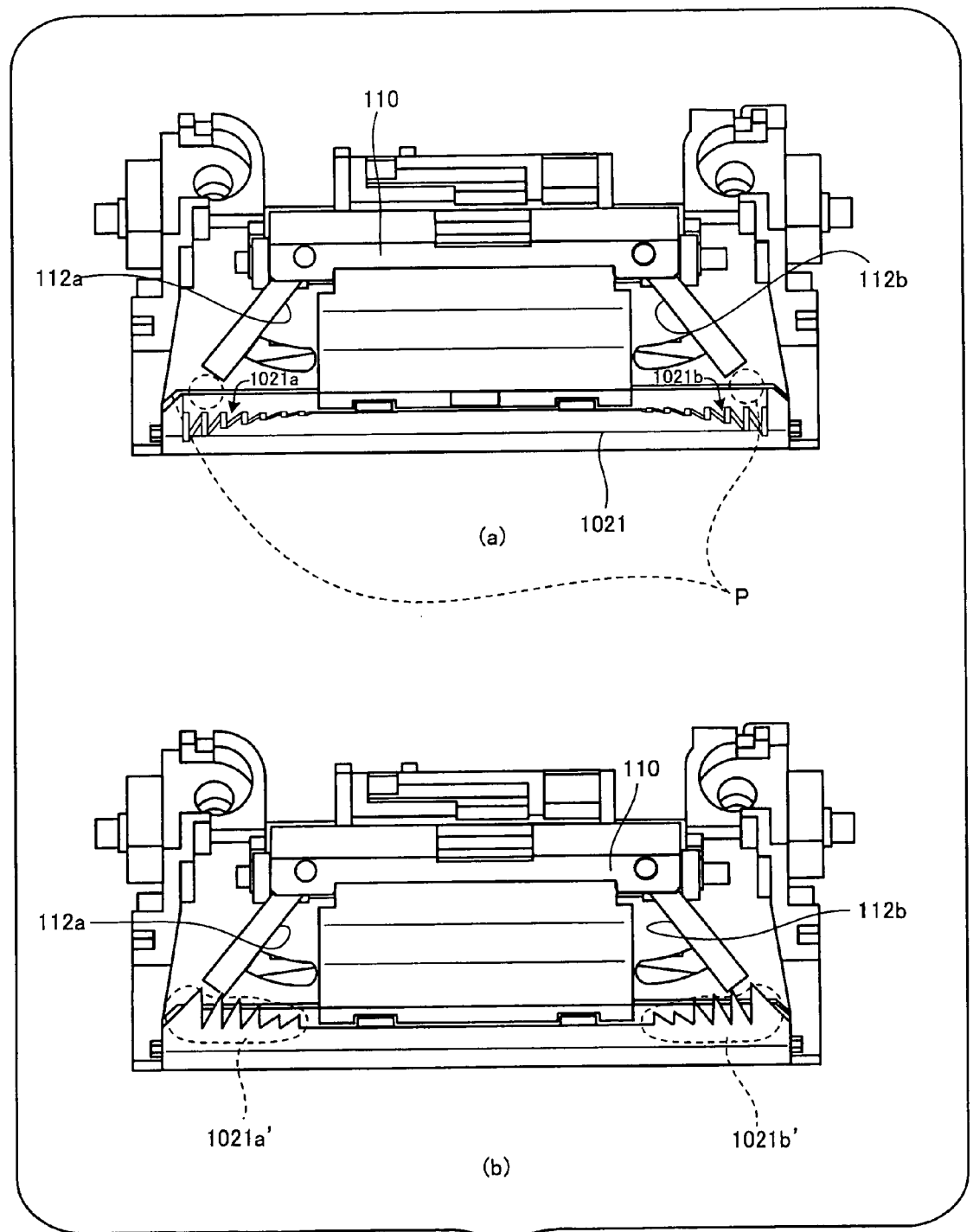
FIG. 7 is a diagram showing one example of configuration for preventing increase in loss which is caused by a gap generated when two reflection side plates are fully adjusted in a direction parallel to the protector.

FIG. 7 shows one example of such a structure.

Part (a) of FIG. 7 shows, from above, a state where the two reflection side plates 112a and 112b are fully adjusted into a direction parallel to the protector 1021 before the image taking apparatus is improved such that light is prevented from leaking from each gap P and the light is positively utilized. Part (b) of FIG. 7 shows, from above, a state where the two reflection side plates 112a and 112b are fully adjusted into a direction parallel to the protector 1021 after the image taking apparatus is improved such that light is prevented from leaking from the gap P and the light is positively utilized.

As shown in part (a) of FIG. 7, if the two reflection side plates 112a and 112b are adjusted into the direction parallel to the protector 1021, the gap P is increased and the gap becomes maximum at the position shown in part (a) of FIG. 7. Hence, as shown in part (b) of FIG. 7, the gap P is bridged so that the light is prevented from leaking and the light is positively utilized by forming the Fresnel lenses 1021a' and 1021b' along a locus formed by tip ends of the two reflection side plates when the inclinations of the two reflection side plates 112a and 112b are adjusted into the direction parallel to the protector 1021.

If the structure shown in part (b) of FIG. 7 is employed, wherever the two reflection side plates 112a and 112b are located, almost all light emitted from the arc tube 110 is introduced into the protector 1021, the light emitting efficiency is enhanced, and image taking auxiliary light can reach further. If the thickness of the end of the protector 1021, i.e., a portion thereof which forms the Fresnel lens is thick as shown in part (b) of FIG. 7, there is an effect that the notches of the Fresnel lenses 1021a' and 1021b' can easily be molded when the Fresnel lenses 1021a' and 1021b' are formed by a mold.

Figure 8:
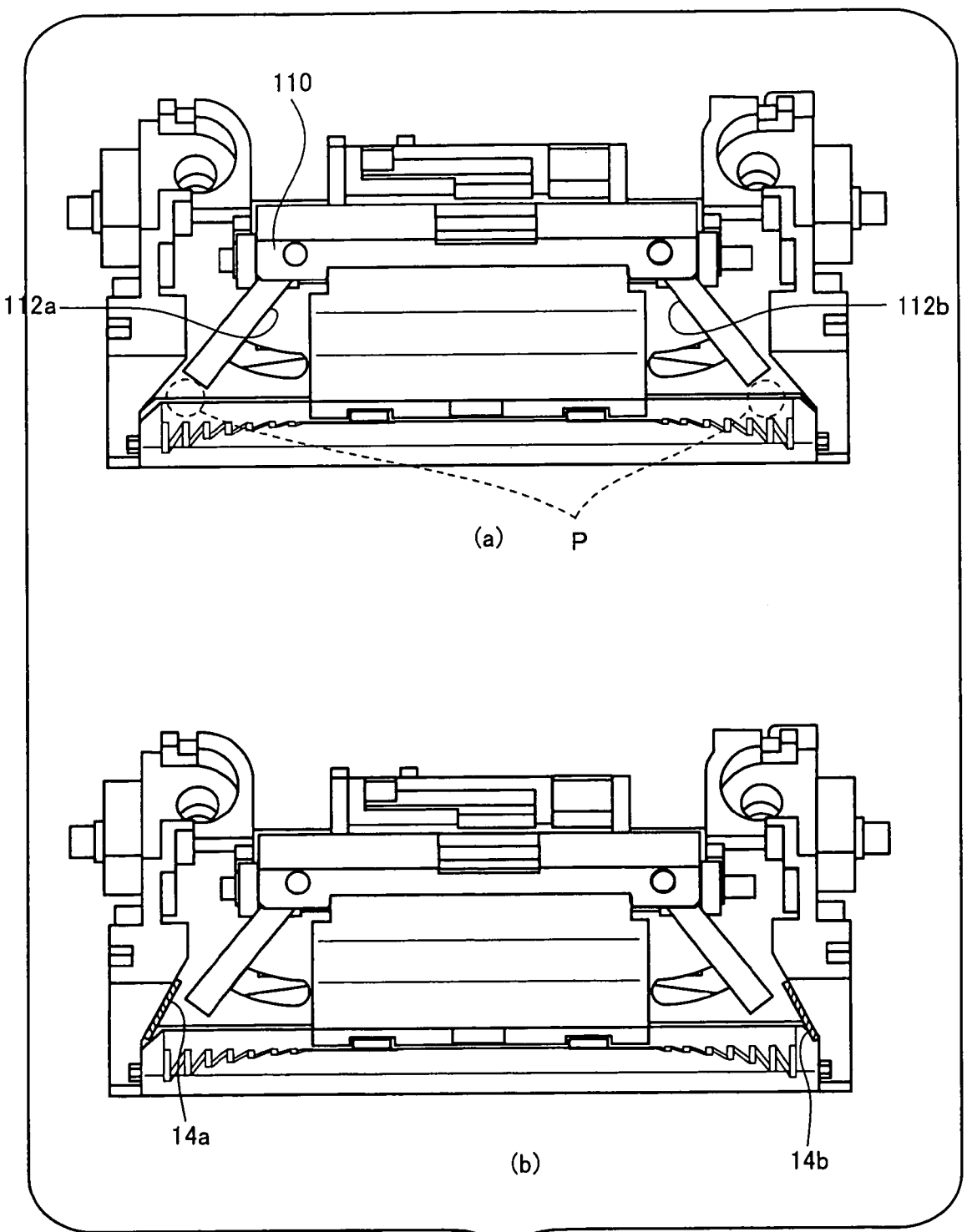
FIG. 8 is a diagram showing another example of configuration for preventing increase in loss which is caused by the gap generated when two reflection side plates are fully adjusted in the direction parallel to the protector.

FIG. 8 is a diagram used for explaining another example of a structure in which light which moves sideway is prevented from leaking, and the light is positively utilized.

Part (a) of FIG. 8 shows the same diagram as that of part (a) of FIG. 7. In part (b) of FIG. 8, instead of modifying the shape of the Fresnel lens as shown in part (b) of FIG. 7, reflection side plates 14a and 14b for reflecting light emitted sideway toward the protector 1021 are provided.

With this structure also, wherever the two reflection side plates 112a and 112b are located, light emitted from the arc tube is introduced to the protector 1021, the subject is radiated with the light and thus, the light emitting efficiency is enhanced.

Figure 9:
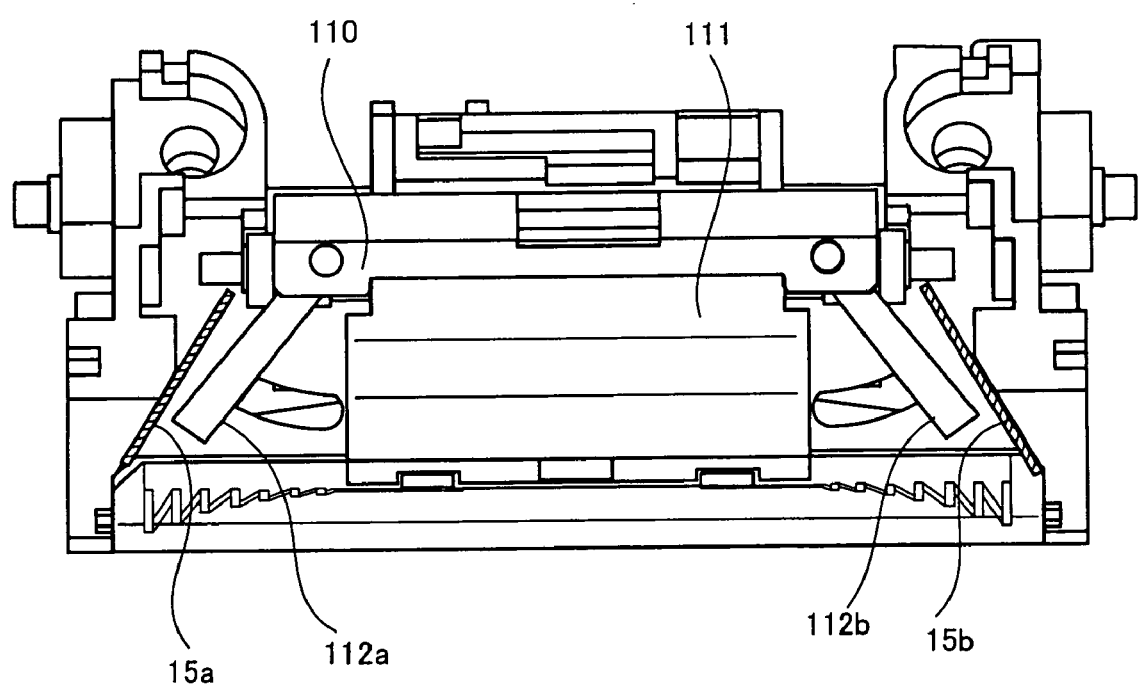
FIG. 9 is a diagram showing another modification of configuration of FIG. 8.
Figure 10:
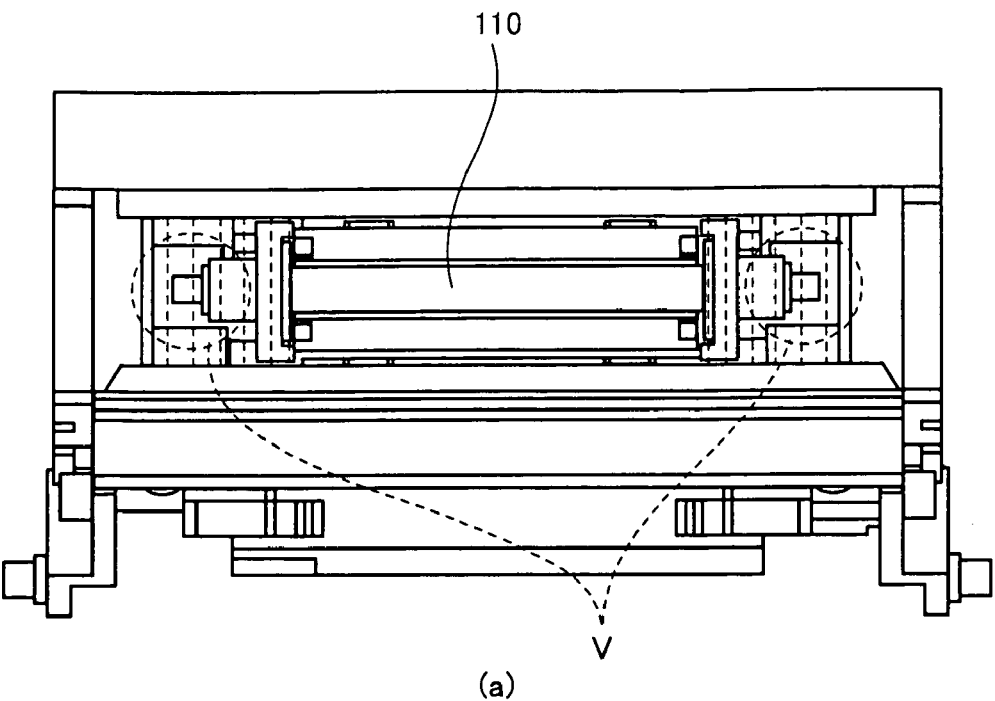
FIG. 10 is a diagram used for explaining function when the configuration shown in FIG. 9 is employed.
Figure 10:
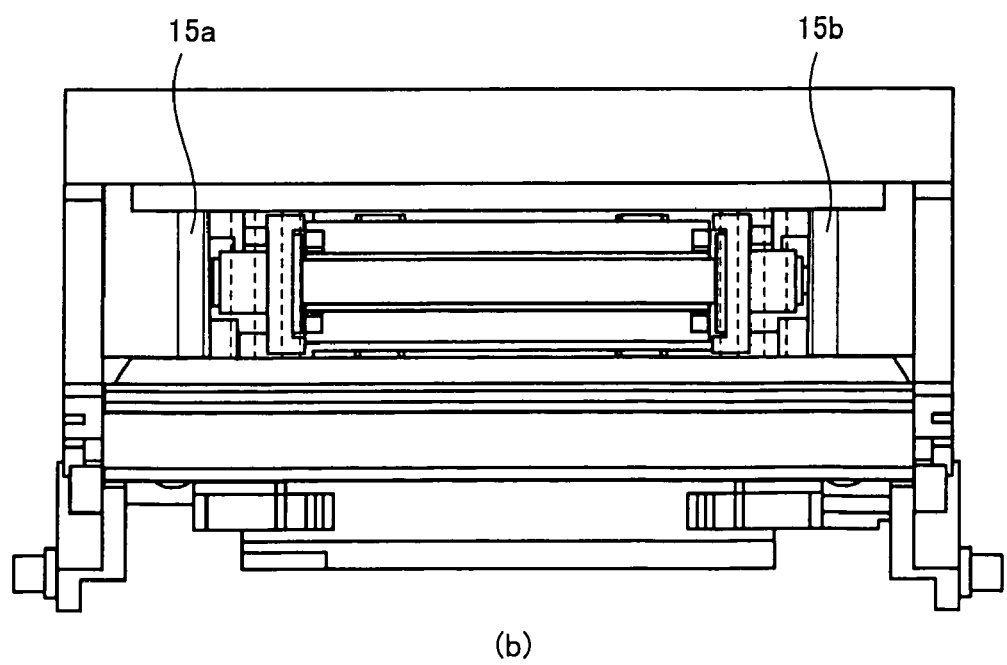

FIGS. 9 and 10 are diagrams used for explaining a modification in which the reflection plate is increased in length and functions as a blind.

As shown in FIG. 9, if the reflection plates 15a and 15b are extended to an end of the arc tube 110, an end V of the arc tube 110 which is seen from a front surface through the Fresnel lens can not be seen as shown in part (a) of FIG. 10 because the reflection plates 15a and 15b each function as a blind, and the outer appearance is improved as shown in part (b) of FIG. 10.

If the light-emitting section is fixed to the main body as described in the first embodiment, there is a problem that if a subject is a human, red-eye phenomenon is generated when flash is emitted toward the subject, or if the lens barrel can be extended telescopically, flash is emitted to the telescopically extended lens barrel 100.

In view of the above circumstances, it is preferable that the light-emitting section can be popped up.

Figure 11:
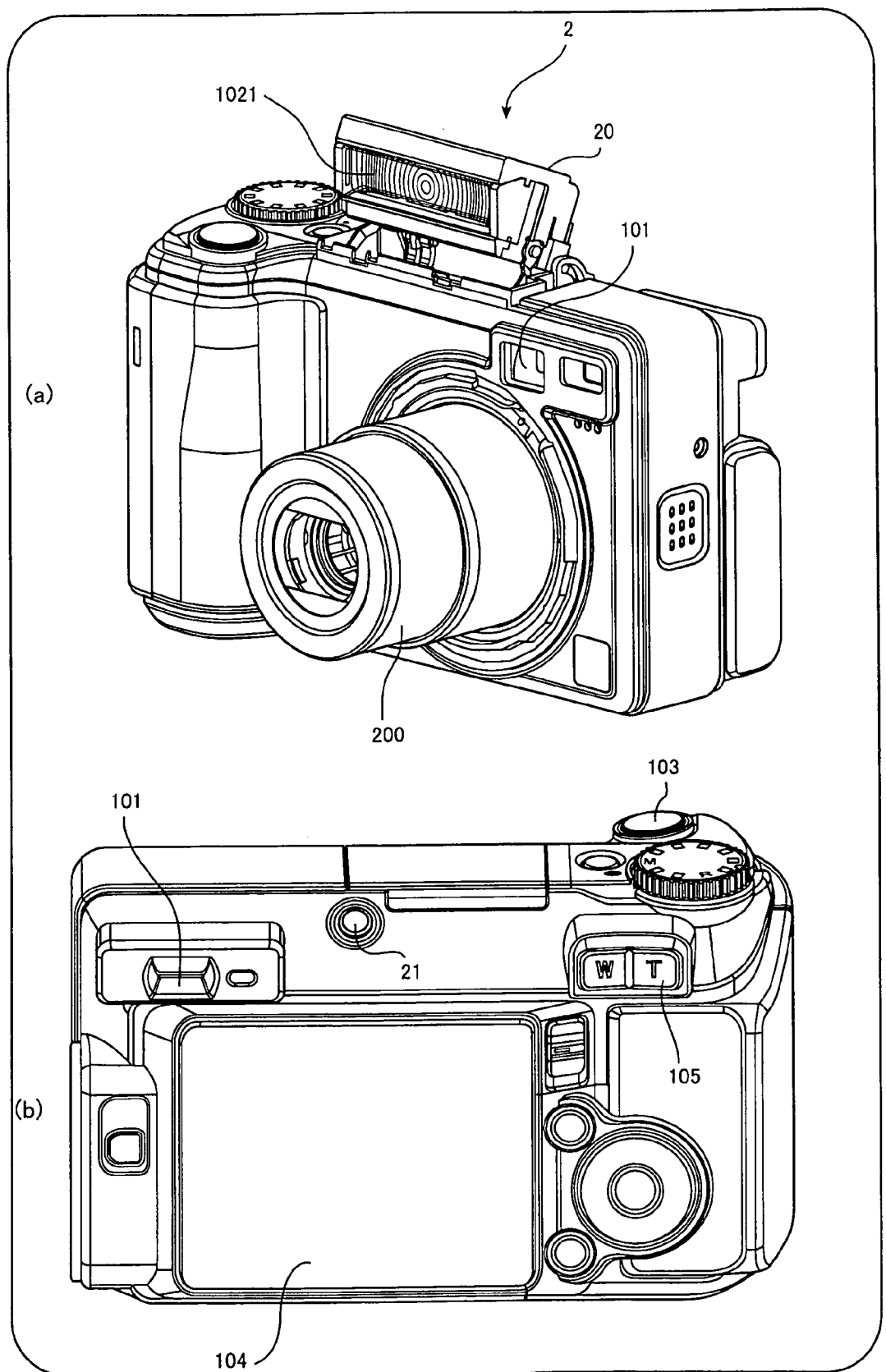
FIG. 11 is a diagram showing an outward appearance of an image taking apparatus of a second embodiment.

FIG. 11 shows an outward appearance of a digital camera 2 of a second embodiment.

In the second embodiment shown in FIG. 11, an accommodation case 20 in which a light-emitting section is accommodated can move between an accommodation position where the accommodation case 20 is accommodated in a main body (i.e., camera body) and a pop-up position where the accommodation case 20 projects from the main body. Part (a) of FIG. 11 is a perspective view of the digital camera 2 as viewed from diagonally above, and part (b) of FIG. 11 is a perspective view of the digital camera 2 as viewed from diagonally behind. To simplify the explanation, the light-emitting section in the accommodation case 20 may be sometimes referred to as a light-emitting section 20 in the following description.

The digital camera 2 of the second embodiment is improved such that even when the light-emitting section 20 is popped up by the operation of a pop-up button 21 (see part (b) of FIG. 11), the motion of the lens barrel 200 is transmitted to an example of the inclination adjuster according to the invention of the light-emitting section 20 (in the second embodiment, the inclination adjuster is composed of the same elements as those used in the first embodiment except the link-moving member 113, and later-described some link members, and details thereof will be described later).

A structure of an outward appearance of the digital camera 2 of the second embodiment shown in FIG. 11 is substantially the same as that of the image taking apparatus of the first embodiment except its shape and layout. Besides, the digital camera 2 is different from the digital camera 1 in that the light-emitting section 20 can move between the accommodation position where the light-emitting section 20 is accommodated in the main body excluding the light-emitting section 20 of the digital camera 2 and the pop-up position where the light-emitting section 20 projects from the main body, and that a pop-up member which pops up the light-emitting section 20, and the pop-up button 21 which instructs to pop up by operation are added.

Here, a peripheral structure of the light-emitting section 20 which pops up and a relation between the light-emitting section 20 and the pop-up button 21 located on the side of a back surface of the camera body will be explained. Members having the same functions as those of FIG. 3 are designated with the same reference characters as those of FIG. 3.

A peripheral structure of the light-emitting section 20 which pops up and a peripheral structure of the pop-up button 21 will be explained first.

FIGS. 12(*a*) to (*d*) show the peripheral structure of the light-emitting section 20 that pops up.

Figure 12A:
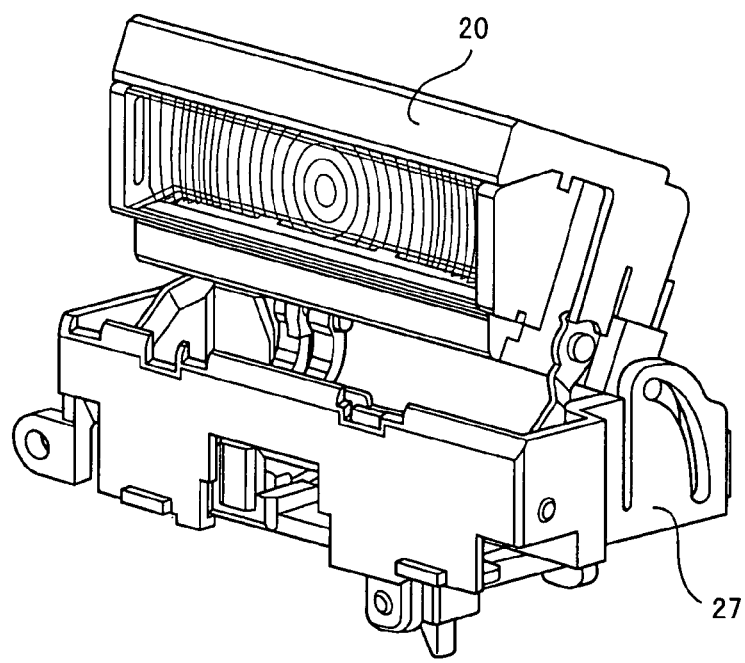
FIG. 12(a) is a diagram of an outward appearance when the light-emitting section 10 is popped up as viewed from a front and diagonally above.
Figure 12B:
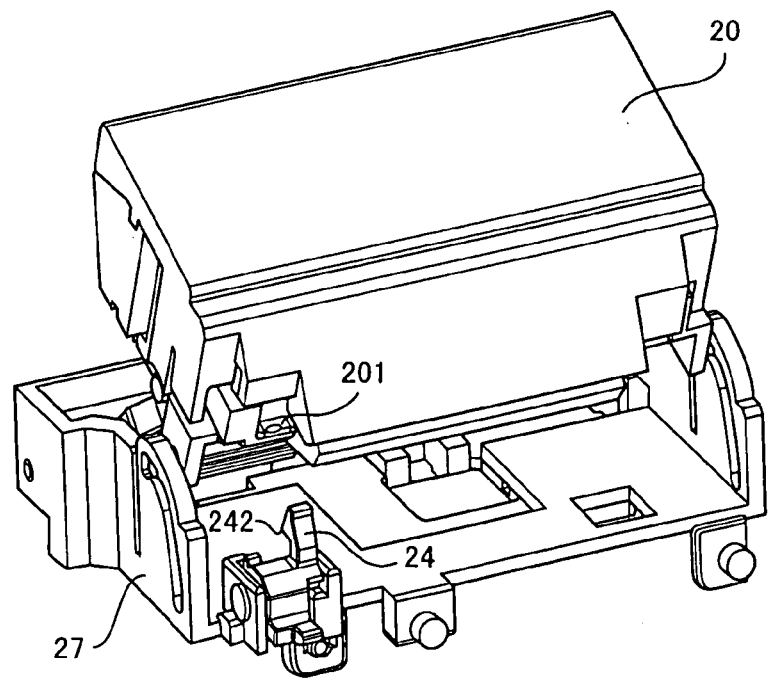
FIG. 12(b) is a diagram of the outward appearance when the light-emitting section 10 is popped up as viewed from behind and diagonally above.
Figure 12C:
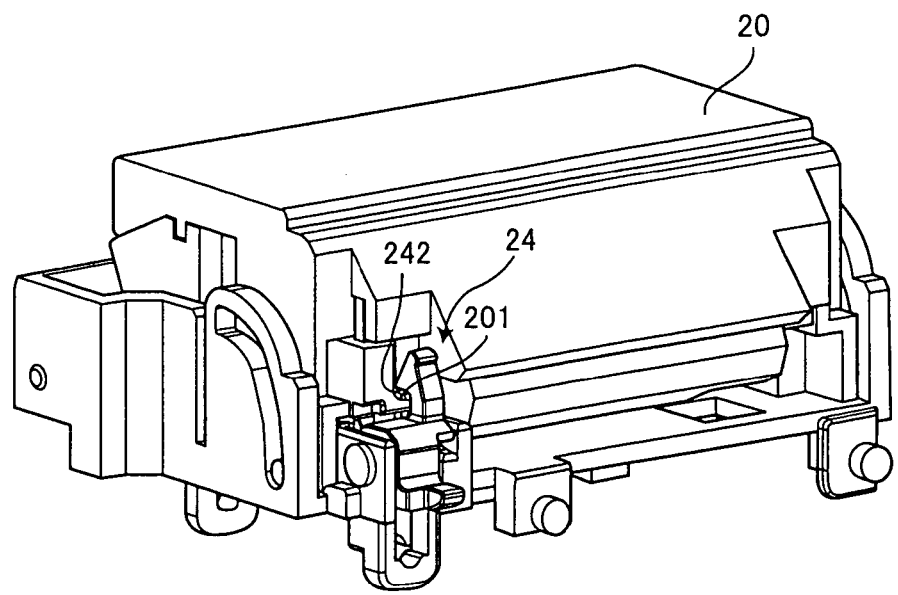
FIG. 12(c) is a diagram used for explaining a retaining member which retains the light-emitting section to the accommodation position.
Figure 12D:
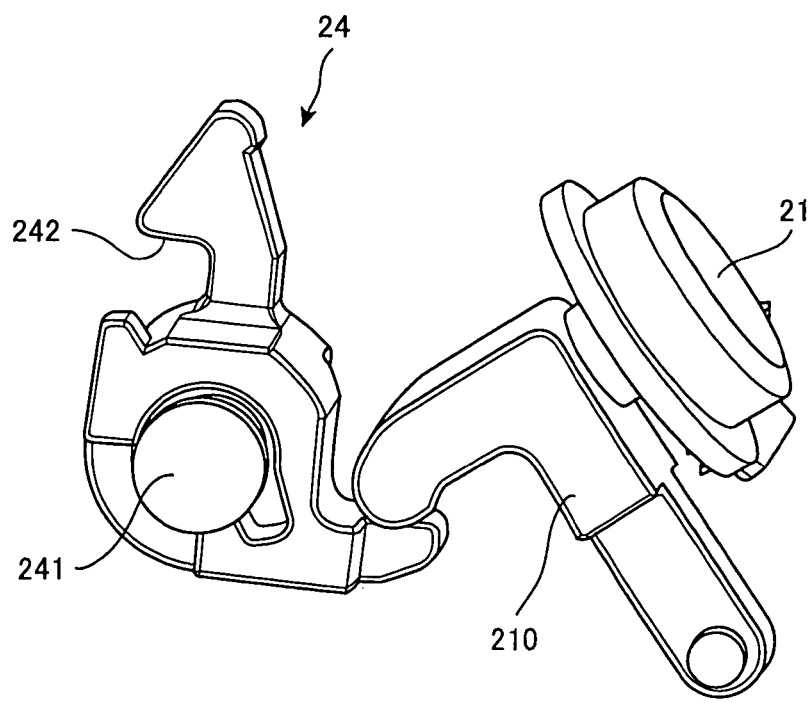
FIG. 12(d) is a diagram used for explaining a relation between a pop-up button and the retaining member which retains the light-emitting section to the accommodation position.

FIG. 12(a) is a diagram of the popped up light-emitting section 20 and a base member 27 which supports the light-emitting section 20 as viewed from front and diagonally above. FIG. 12(b) is a diagram of the popped up light-emitting section 20 and the base member 27 which supports the light-emitting section 20 as viewed from behind and diagonally above. FIG. 12(c) shows a retaining member 24 in a state where the light-emitting section 20 is retained in the accommodation position. FIG. 12(d) shows a relation between the retaining member 24 and the pop-up button 21 which pops up the light-emitting section 20 while releasing the retained state of the retaining member 24.

As shown in FIGS. 12 (a) to (c), the light-emitting section 20 is supported by the base member 27 such that the light-emitting section 20 can pop up. In a state where it is not yet popped up as shown FIG. 12(c), a pawl section 242 formed on a tip end of the retaining member 24 provided on the side of the base member 27 is retained to a retaining receiving section 201 on the side of the accommodation case 20 in which the light-emitting section is accommodated. As shown in FIG. 12(d), the retaining member 24 is turnably supported such that the retaining member 24 can turn around a turning shaft 241. In a state where the pawl section 242 of the retaining member 24 is retained to the retaining receiving section 201 of the accommodation case 20 in which the light-emitting section is accommodated, it is biased in the counterclockwise direction in FIG. 12(d) by twist spring (later described) so that this state is maintained. In this state, if the pop-up button 21 is pushed, the retaining member 24 is turned in the clockwise direction against the biasing force of the twist spring (not shown) through the connecting member 210 by the pushing down motion of the pop-up button 21, the retaining state between the pawl section 242 of the retaining member 24 and the retaining receiving section 201 of the accommodation case 20 is released, and the light-emitting section 20 is popped up to the pop-up position.

Next, a power transmission member which transmits motion of the lens barrel 200 to the light-emitting section 20 will be explained.

Figure 13:
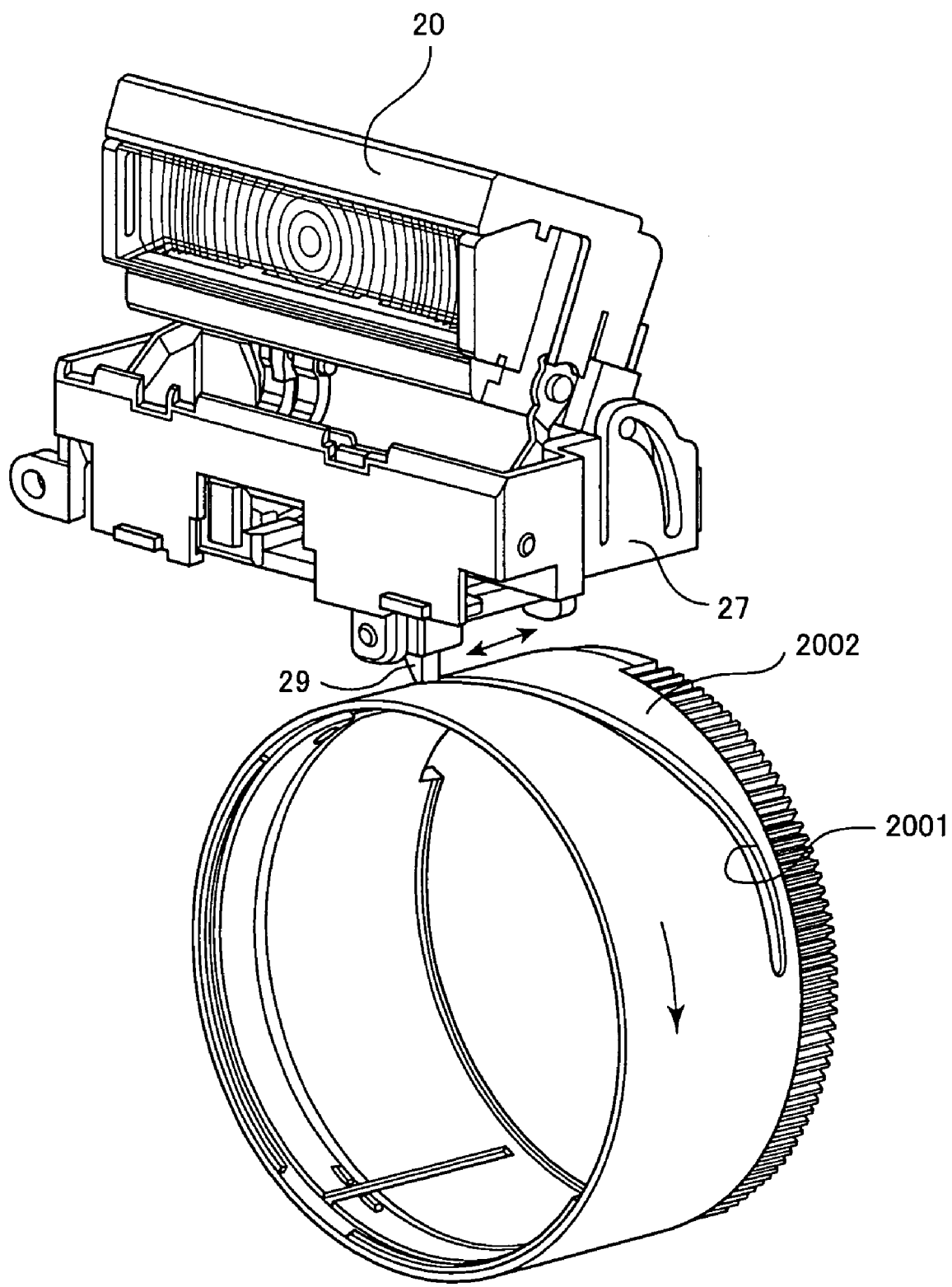
FIG. 13 is a diagram used for explaining a relation between a cam cylinder 2002 and a light-emitting section 20 located in a lens barrel.
Figure 14:
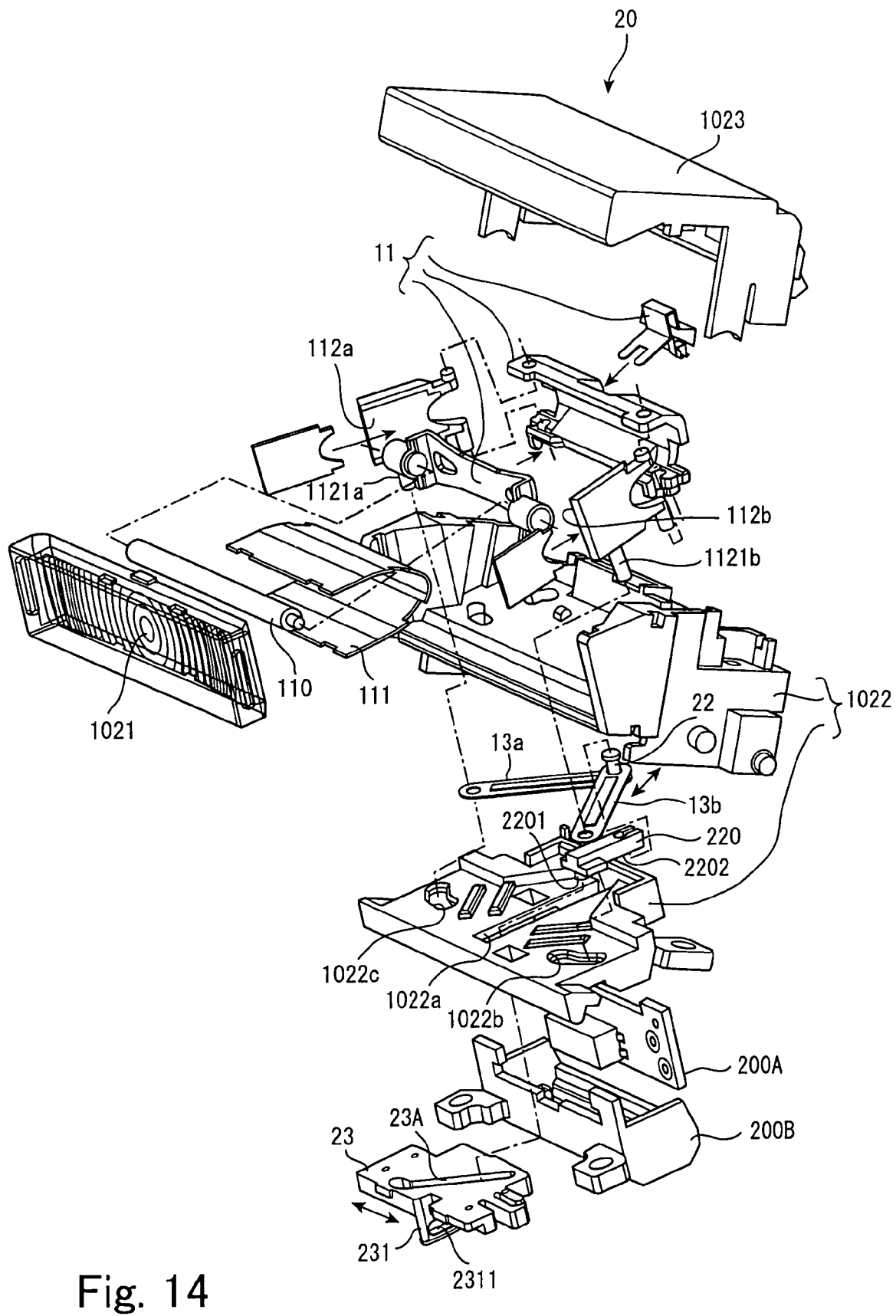
FIG. 14 is a diagram used for explaining configuration of a power transmission member on the side of a light-emitting section which receives power from a main body when the light-emitting section 20 is popped up.
Figure 15:
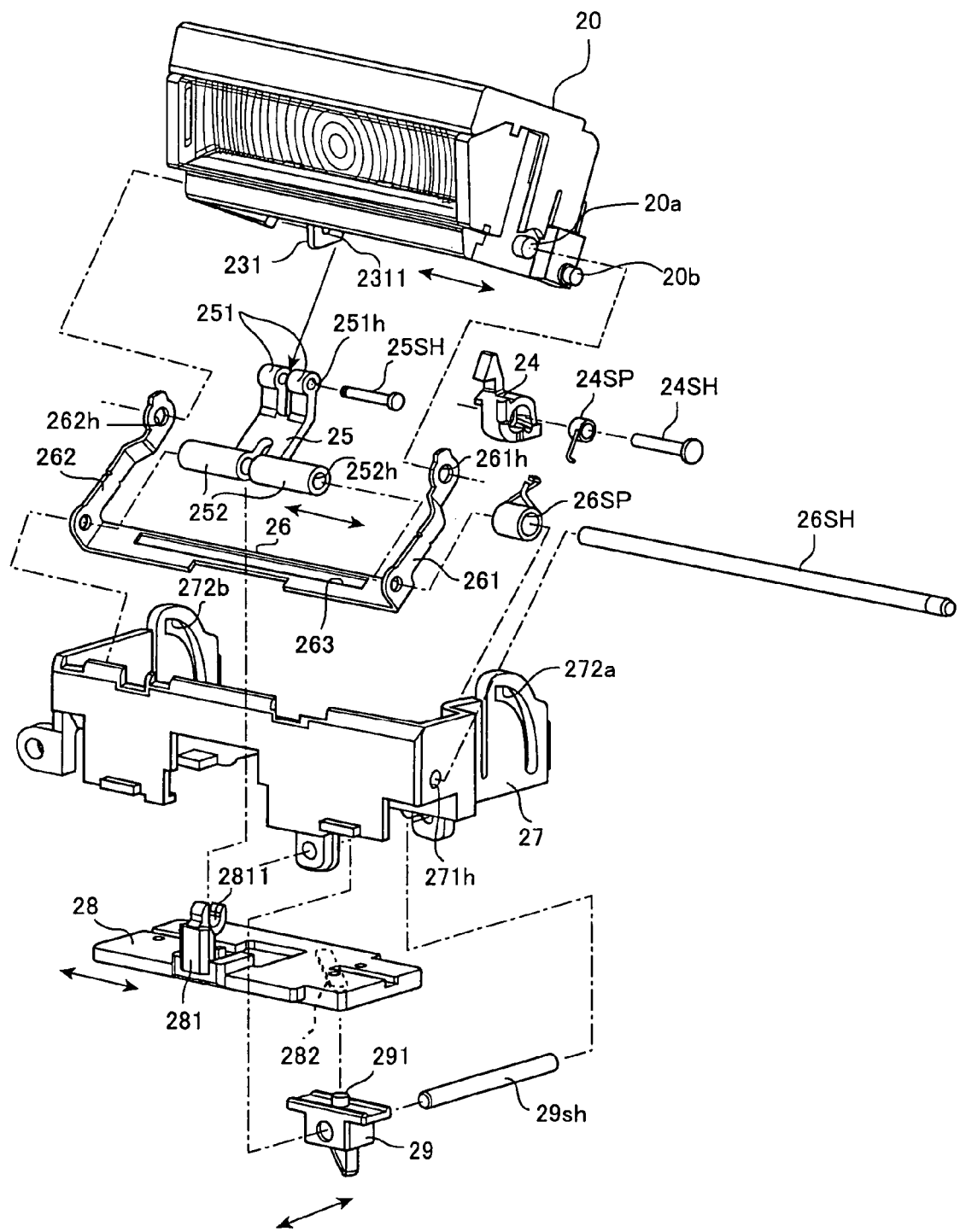
FIG. 15 is a diagram used for explaining configuration of a popping up member required for assembling the light-emitting section 20 in the main body such that the light-emitting section 20 can be popped up, and configuration of the power transmission member on the side of the main body which transmits power from the lens barrel to the light-emitting section also when the light-emitting section 20 is popped up.

FIG. 13 is a diagram used for explaining a relation between the light-emitting section 20 and a cam cylinder 2002 located in the lens barrel. FIGS. 14 and 15 are exploded views used for explaining the light-emitting section 20, a pop-up member required for assembling the light-emitting section 20 into the main body, and the power transmission member.

FIG. 13 shows the cam cylinder 2002 in the lens barrel 200. The cam cylinder 2002 has a cam groove 2001 formed on its outer peripheral surface. A connecting member 29 is disposed on a lower surface of the base member 27. The connecting member 29 is engaged in the cam groove 2001. The base member 27 supports the light-emitting section 20.

When the lens barrel 200 shown in FIG. 11 moves forward and rearward, the cam cylinder 2002 shown in FIG. 13 rotates, and the connecting member 29 moves forward and rearward by this rotation. Therefore, the connecting member 29 is connected to the link-moving member 113 (see FIG. 3) on the lower surface of the folder 11 on the side of the light-emitting section 10 explained in the first embodiment.

In the second embodiment, however, since the light-emitting section 20 pops up, the link member 113 shown in FIG. 3 and the connecting member 29 cannot directly be connected to each other.

In the second embodiment, therefore, some power transmission members are added between the light-emitting section 20 and the lens barrel 200 such that when the connecting member 29 moves forward and rearward by the rotation of the cam cylinder 2002, the forward and rearward motion can efficiently be transmitted to the light-emitting section 20. FIGS. 14 and 15 show an example when the inclinations of the two reflection side plates 112a and 112b (see FIG. 3) are adjusted by power transmitted by the power transmission members.

These power transmission members will be explained with reference to FIGS. 14 and 15.

FIGS. 14 and 15 are exploded views of the configurations of the light-emitting section 20 and a portion between the light-emitting section 20 and the lens barrel 200.

Since the configuration of the lens barrel 200 shown in FIG. 14 is almost the same as that of the first embodiment except slight differences in shape and layout, the link member 23, the link member 220 and a pin 22 corresponding to an example of the power transmission member of the present invention will be explained mainly. In FIG. 14, the folder 11 and the base section 1022 shown in FIG. 3 are shown in an exploded manner and thus, members which will become the folder 11 and the base section 1022 when the camera is assembled are designated with the same reference characters as those of FIG. 3. In FIG. 14, a substrate 200A and a case 200B in which the substrate 200A is accommodated are also shown. A light-emitting circuit (including a trigger coil and the like) which emits light in the arc tube 110 is mounted on the substrate 200A (not shown in FIG. 3).

The modification in configuration on the side of the light-emitting section 20 will be explained with reference to FIG. 14.

In the first embodiment, the link-moving member 113 on the lower surface of the folder 11 is engaged with the lens barrel 100 as shown in FIG. 3. In the present embodiment, since it is necessary to dispose several members for popping up the light-emitting section 20 on the central lower surface of the accommodation case 20, the link pin 22, the link member 220 and the link member 23 having the cam groove 23A are added. Among them, the link member 23 receives power from the lens barrel 200, the received power is transmitted to the link member 220 and the link pin 22, the power is further transmitted to the two reflection side plates 112a and 112b by the link members 13a and 13b, thereby adjusting the inclinations of the two reflection side plates 112a and 112b. Therefore, in this example, a through hole 1022a in which the link member 220 is fitted is added between the through holes 1022b and 1022c so that the link member 220 can be moved forward and rearward by the power received from the lens barrel.

Here, the relation between the link member 23, the link member 220 and the link pin 22 will be explained.

First, the link member 23 shown at the lowermost portion in FIG. 14 is provided at its one surface on the side of the arc tube with the cam groove 23A, and a link pin 2201 of the link member 220 which is fitted such that it can move forward and rearward through the through hole 1022a is engaged in the cam groove 23A. The link pin 22 provided on a connection between the L-shaped link members 13a and 13b is fitted from below into a hole 2202 provided in a rear end of the link member 220. The engaging members 1121a and 1121b extending from the two reflection side plates 112a and 112b downward are allowed to pass through holes provided in the tip ends of the L-shaped link members 13a and 13b and engaged in the through holes 1022c and 1022b like the first embodiment.

With this, the link member 23 receives power from the lens barrel and moves laterally (in the direction shown with the arrow in the drawing). With this, the link member 220 moves forward and rearward along the through hole 1022a, and the link pin 22 located at the connection between the L-shaped link members 13*a* and 13*b* moves forward and rearward. With the forward and rearward motion of the link pin 22 (moves in the direction of the arrow shown near the reference character 22), the link members 13*a* and 13*b* move in synchronization with the motion of the engaging members 1121*a* and 1121*b* of each reflection side plate 112*a* and 112*b* respectively along the HA-shaped holes 1022*b* and 1022*c*, and the inclinations of the both reflection side plates 112*a* and 112*b* are adjusted.

That is, the inclinations of the reflection side plates 112*a* and 112*b* are adjusted by power from the lens barrel transmitted by the three power transmission members, i.e., the link member 220, the link pin 22 and the link member 23.

Next, the way how the power from the lens barrel is transmitted to the link member 23 will be explained.

As shown in FIG. 14, a projecting piece 231 which receives power from the lens barrel 200 is provided on one of surfaces of the link member 23 opposite from the other surface on which the cam groove 23A is formed. A connection hole 2311 is formed in the projecting piece 231. A link fork section 25 (later described) on the side of the main body is connected to the connection hole 2311.

Here, explanation will be made as to how the link member 23 is moved laterally (in the direction of arrow shown near the reference character 2311 in FIG. 14) in accordance with motion of the lens barrel 200 with reference to FIG. 15.

Several power transmitting members except the link member 23 are shown in FIG. 15. These power transmitting members are provided between the lens barrel 200 and the light-emitting section 20. A configuration for popping up the light-emitting section 20 is also shown in FIG. 15.

In upper portion of FIG. 15, the light-emitting section 20 in which members shown in the exploded view in FIG. 14 have been assembled is shown. A portion of the projecting piece 231 of the link member 23 explained with reference to FIG. 14 is seen in a lower portion of the light-emitting section 20 in FIG. 15. If the power transmitting member on the side of the main body is connected to the projecting piece 231, the link member 23 moves laterally (in the direction shown with the arrow near the reference character 2311 in the drawing). That is, if the link member 23 moves in accordance with the motion of the lens barrel 200, the inclinations of the reflection side plates 112*a* and 112*b* are adjusted in accordance with the motion of the lens barrel as described above.

First, explanation will be made as to how the power is transmitted to the link member 23 in the light-emitting section 20 from the lens barrel 200 explained in FIG. 14.

The light-emitting section 20 is shown in the uppermost region in FIG. 15. The link fork section 25 connected to the projecting piece 231 of the link member 23 is shown below the light-emitting section 20. A bifurcated fork 251 is formed on the side of the light-emitting section 20 of the link fork section 25. The tip end of the fork 251 has a shaft receiving hole 251*h* for receiving a link shaft 25SH. After the fork 251 of the link shaft 25SH is disposed such as to sandwich the projecting piece 231, if the link shaft 25SH is inserted such as to penetrate the shaft receiving hole 251 and the connection hole 2311 of the projecting piece 231 of the link member 23, the link member 23 is connected to the link fork section 25 which is a power transmission member on the side of the main body.

If the link member 23 is connected to the link fork section 25 which is a portion of the power transmission member on the side of the main body, power transmitted from the lens barrel 200 by other power transmission members is transmitted to the link fork section 25. With this, the link member 23 in the light-emitting section 20 moves together with the link fork section 25.

Explanation will be made as to how the motion of the lens barrel 200 is transmitted to the link fork section 25 when the lens barrel 200 moves forward and rearward in the order from lower portion to upper portion in FIG. 15.

As explained in FIG. 13, the cam cylinder 2002 and the connecting member 29 on the side of the lens barrel 200 are engaged, and if the cam cylinder 2002 rotates in accordance with extension and contraction of the lens barrel 200, the connecting member 29 moves forward and rearward (in the direction shown with the arrow in FIG. 15) as shown in FIG. 15. The connecting member 29 is provided with a hole through which a shaft 29*sh* is inserted. If the shaft 29*sh* is inserted into the hole, the connecting member 29 is mounted on a lower surface of the base member 27 so that the connecting member 29 can freely move on the shaft 29*sh*.

In this example, the forward and rearward motion of the connecting member 29 is converted into lateral motion and is transmitted to the link member 23. To this end, an inversion plate 28 is disposed above the connecting member 29. The inversion plate 28 is disposed such as to be superposed on the connecting member 29 and is connected to the base member 27 such that the inversion plate 28 can move.

A cam groove 282 is formed in a diagonal direction in one surface of the inversion plate 28 on the side of the connecting member 29. A cam pin 291 of the connecting member 29 is engaged in the cam groove 282. Thus, if the connecting member 29 moves forward and rearward, the cam pin 291 moves along the diagonal locus of the cam groove 281, and the inversion plate 28 moves laterally (shown with the arrow) by the motion of the cam pin 291.

The inversion plate 28 which moves laterally is provided with a projecting piece 281 inserted into a gap of a fork 252 of the link fork section 25. The projecting piece 281 is provided with a notch 2811 for receiving a pop-up link shaft 26SH.

The pop-up link shaft 26SH is for assembling the pop-up link shaft 26SH into the base member 27. When the pop-up link 26 is assembled in the base member 27, the pop-up link shaft 26SH is first inserted into a hole 271*h* formed in a sidewall of the base member 27, the light-emitting section 20 is inserted through a torsion spring 26SP which biases the light-emitting section 20 into the pop up direction and is assembled into the base member 27 such that it is inserted into the shaft receiving hole 252*h* formed in the fork 25 of the link fork section 25. If the link fork section 25 is slidably disposed in a slide groove 263 of the pop-up link 26 by inserting the pop-up link shaft 26SH, the link fork section 25 slides along the slide groove 263 in accordance with the lateral motion of the inversion plate 28 so that the power is transmitted to the link member 23. With this, the power of the lens barrel is transmitted to the link member 23 in the light-emitting section 20.

In FIG. 15, several members required for popping up the light-emitting section 20 are also shown. Configurations of these members will be explained.

When the light-emitting section 20 is popped up, the pop-up link 26 supports the light-emitting section 20. The pop-up link 26 is provided at its both ends with arm sections 261 and 262 such as to project toward the light-emitting section 20. Holes 261*h* and 262*h* are formed in tip ends of the arm sections 261 and 262. Projections are formed on both sides of the accommodation case 20 (although only one projection 20*a* is shown in FIG. 15, one more projection is provided on the opposite side also) are fitted into the holes 261*h* and 262*h*. With this, the light-emitting section 20 can pop up.

The light-emitting section is accommodated in the accommodation case 20. The accommodation case 20 is also provided with another projection (although only one projection 20b is shown in FIG. 15, one more projection is provided on the opposite side also) in addition to the projection 20a to which the arm sections 261 and 262 of the pop-up link 26 are fitted. These projections 20b are fitted into guide holes 272a and 272b formed in the base member 27. The guide holes 272a and 272b are of arc in shape, the arc starting ends and the arc terminating ends of the guide holes 272a and 272b correspond to the pop-up position and the accommodation position of the light-emitting section 20, respectively.

The projections 20b of the accommodation case 20 are biased by the spring biasing force and turned and located at the terminating end positions of the guide holes 272a and 272b. With this, the light-emitting section 20 is popped up to the pop-up position shown in FIGS. 12(a) and (b), the accommodation case 20 is retained to the main body by the retaining member 24 as shown in FIG. 12(c) such that the projections 20b of the accommodation case 20 are located at the starting end positions of the guide holes 272a and 272b and with this, the light-emitting section 20 is accommodated in the accommodation position of the main body.

With this, irrespective whether the light-emitting section 20 is located in the pop-up position or the accommodation position, the inversion plate 28 moves laterally in accordance with the forward and rearward motion of the connecting member 29. If the inversion plate 28 moves laterally, the link fork section 25 also moves laterally, the link member 23 in the light-emitting section 20 shown in FIG. 14 moves laterally in accordance with the lateral motion of the link fork section 25, and the link member 220 and the link pin 22 move forward and rearward and with this, the inclinations of the two reflection side plates 112a and 112b are adjusted.

In this example, the link member 220, the link pin 22, the link member 23, the link fork section 25, the inversion plate 28 and the connecting member 29 from the light-emitting section 20 correspond to an example of the power transmission members of the present invention which transmit power from the lens barrel. The torsion spring 26SP corresponds to an example of the biasing member of the invention which biases the light-emitting section 20 in the pop direction. The retaining member 24 corresponds to an example of the retaining member of the invention which retains the light-emitting section 20 in the accommodation position.

The present invention is also applied to the image taking apparatus having a light-emitting section which can move between the pop-up position projecting from the main body and the accommodation position in which the image taking apparatus except the light-emitting section is accommodated in the main body.

As described above, according to the configurations shown in FIGS. 14 and 15, even if the light-emitting section 20 is in the accommodation position or even if the light-emitting section 20 is in the pop-up position, or even if the light-emitting section 20 is in an intermediate position between the accommodation position and the pop-up position, the power transmission member functions in the same manner. If the power is transmitted wherever the light-emitting section 20 is located, even if a user takes a picture while covering the popped up light-emitting section 20 with his or her hand, there is an effect that the flash is emitted from the light-emitting section 20 in such a manner that the radiation field is appropriately adjusted. With this configuration, even if the light-emitting section is in the accommodation position, or even if the light-emitting section is in the pop-up position, the flash can be emitted in an irradiation field suitable for the focal length.

As explained above, an image taking apparatus having a light-emitting section capable of precisely adjusting the irradiation field is realized.

Although the digital camera is described in the embodiment, the present invention can also be applied to a silver salt camera of course.

What is claimed is:

1. An image taking apparatus which includes an image taking lens capable of varying a focal length and which takes an image by capturing subject light by the image taking lens, the image taking apparatus comprising:
   a light-emitting section which emits flash toward a subject in synchronization with an image-taking operation,
   wherein the light-emitting section comprises:
   a rod-like arc tube,
   a reflector which surrounds a rear portion of the arc tube in a circumferential direction and which forwardly reflects flash emitted rearward from the arc tube,
   two reflection side plates which are disposed on both sides of the reflector and which reflect flash from the arc tube,
   a protector which is provided, at locations thereof corresponding to both ends of the arc tube, with Fresnel lenses for inwardly condensing transmission flash, and which covers a front surface of the arc tube and through which flash from the arc tube transmits toward the subject, and
   an inclination adjuster which adjusts inclination of the two reflection side plates in accordance with a focal length of the image taking lens,
   wherein the inclination adjuster adjusts inclinations of the two reflection side plates independently from each other.

2. The image taking apparatus according to claim 1, wherein the light-emitting section is capable of moving between an accommodation position where the light-emitting section is accommodated in a main body of the image taking apparatus and a pop-up position projected from the main body,
   the image taking apparatus comprises a biasing member which biases the light-emitting section in a pop-up direction, a retaining member which retains the light-emitting section to the accommodation position, a pop-up button which releases the retaining state maintained by the retaining member and pops up the light-emitting section, and a power transmission member which transmits power required for allowing the light-emitting section to carry out motion in accordance with a focal length of the image taking lens to the inclination adjuster from the main body.

3. The image taking apparatus according to claim 1, wherein the inclination adjuster adjusts inclinations of the two reflection side plates into such a direction that the two reflection side plates are oriented parallel to the protector as the focal length of the image taking lens is closer to the long focus side.

4. The image taking apparatus according to claim 3, wherein the protector has a Fresnel lens formed along a locus formed by a tip end of each of the two reflection side plates when the inclination adjuster adjusts inclinations of the two reflection side plates in a direction parallel to the protector.

5. The image taking apparatus according to claim 3, further comprising reflection plates which reflect light emitted sideway beyond the reflection side plates toward the protector.

6. The image taking apparatus according to claim 2, wherein the power transmission member transmits power to the inclination adjuster even if the light-emitting section is located in any of the accommodation position, the pop-up position and an intermediate position between the accommodation position and the pop-up position.

* * * * *